US012737416B2

(12) United States Patent
Yim et al.

(10) Patent No.: US 12,737,416 B2
(45) Date of Patent: Sep. 15, 2026

(54) METHOD AND SYSTEM FOR UNDERSTANDING AND FULFILLING VERB-BASED SUCCINCT QUERIES

(71) Applicant: GOOGLE LLC, Mountain View, CA (US)

(72) Inventors: Keun Soo Yim, San Jose, CA (US); Adam Coimbra, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 18/373,192

(22) Filed: Sep. 26, 2023

(65) Prior Publication Data

US 2025/0103648 A1 Mar. 27, 2025

(51) Int. Cl.
*G06F 16/632* (2019.01)
*G06F 16/683* (2019.01)
*G10L 15/22* (2006.01)

(52) U.S. Cl.
CPC .......... *G06F 16/632* (2019.01); *G06F 16/685* (2019.01); *G10L 15/22* (2013.01); *G10L 2015/223* (2013.01); *G10L 2015/228* (2013.01)

(58) Field of Classification Search
USPC ......................... 704/246, 247, 251, 252, 275
See application file for complete search history.

(56) References Cited

U.S. PATENT DOCUMENTS

2013/0110520 A1 5/2013 Cheyer et al.
2016/0350304 A1* 12/2016 Aggarwal .............. G10L 15/26
2020/0279555 A1 9/2020 Shapiro
2021/0271816 A1* 9/2021 Robert Jose ............ G06N 7/01
2021/0272554 A1* 9/2021 Robert Jose ........... G10L 15/26
2022/0020365 A1* 1/2022 Carbune ................ G06F 3/165
2023/0136902 A1* 5/2023 Tunstall-Pedoe ....... G10L 15/16 704/2
2023/0144884 A1 5/2023 Carbune et al.
2023/0245654 A1 8/2023 Shrivastava

FOREIGN PATENT DOCUMENTS

CA 2787351 A1 7/2011
EP 3959713 A1 3/2022

OTHER PUBLICATIONS

European Patent Office; International Search Report and Written Opinion issued in Application No. PCT/US2024/048357; 16 pages; dated Jan. 9, 2025.
"Google Assistant for Android" Retrieved from https://developer.android.com/guide/app-actions/overview, 7 pages, dated May 4, 2023.
Anantha et al., "Learning to Rank Intents in Voice Assistants" arXiv:2005.00119v2 [cs.LG], 11 pages, dated May 4, 2020.

* cited by examiner

*Primary Examiner* — Leonard Saint-Cyr
(74) *Attorney, Agent, or Firm* — Gray Ice Higdon

(57) ABSTRACT

Some implementations receive audio data capturing a verb-based succinct query that includes an action but is void of any app entity and determine, based on processing of the audio data, the action and one or more instance candidates associated with the action. Some of those implementations further query an app entity database for usage information and/or capability information of one or more app entities that correspond to the one or more instance candidates and generate, based on selecting from the one or more app entities, a response or action responsive to the verb-based succinct query.

19 Claims, 7 Drawing Sheets

METHOD AND SYSTEM FOR UNDERSTANDING AND FULFILLING VERB-BASED SUCCINCT QUERIES

BACKGROUND

Users, when using a client device such as a smartphone, are often presented with a plurality of applications installed at, or otherwise accessible, via the client device. From the plurality of presented applications, users can choose to explicitly trigger an application (e.g., clock app), to fulfill an application action (e.g., turn off or turn on) with respect to a desired entity (e.g., an alarm or timer within the clock app) that is accessible via the application. This often means that, if a user wants to access the desired entity, the user has to accurately identify the application that enables access to the desired entity, for the particular application to be explicitly triggered to provide the user with access to the desired entity. In situations where the user is using an "interactive assistant" (also referred to as "chatbot," "interactive personal assistant," "intelligent personal assistant," "personal voice assistant," "conversational agent," "automated assistant", "audio assistant", or simply "assistant," etc.) to access the desired entity, the user often will have to accurately identify the particular application and/or the desired entity in a spoken query, for the interactive assist to correctly understand and fulfill an action based on the spoken query.

If the user provides an incomplete or inadequate query (e.g., a succinct spoken query of "turn back on") that identifies neither the particular application nor the desired entity, the interactive assistant may not be responsive to such spoken query. As a result, no application is triggered to fulfill an application action (e.g., turn the alarm back on, etc.) with respect to the desired entity (e.g., alarm). This will result in repeated attempts by the user in providing an appropriate query that can trigger the particular application that provides access to the desired entity. Such repeated attempts can lead to extensive consumption of computing and/or battery resources of the client device.

SUMMARY

Implementations disclosed herein relate to utilizing dynamic application capability binding information and/or application entity usage information for understanding and/or fulfilling an action according to a verb-based succinct spoken query that does not explicitly identify an app or app entity ("application entity", which is accessible within an app) to perform the action. In various implementations, an app entity database ("application entity database") can be generated and included (e.g., locally) in a client device, to store the dynamic application capability binding information (and/or the application entity usage information) of a plurality of app entities donated by one or more applications of the client device. The app entity database can be searched for dynamic application capability binding information (and/or application entity usage information) of one or more app entities in response to receiving the verb-based succinct spoken query that does not explicitly identify an app or app entity to perform the action. It is noted that in various implementations, "app" is short for "application".

In some implementations, the app entity database can be a structured database (or semi-structured database) that includes a plurality of entries each corresponding to an app entity donated by a respective application installed at (or accessible via) the client device (and/or one or more additional computing devices). Each entry stored in the app entity database can include dynamic application capability binding information and/or application entity usage information associated with the corresponding app entity. As a non-limiting example, the app entity database can store an entry for an app entity of "timer" and an additional entry for an app entity of "stopwatch" that are both donated by a clock application.

The entry for the app entity of "timer" can include application capability binding information (dynamic and/or static) and/or application entity usage information of the app entity of "timer". Similarly, the additional entry for the app entity of "stopwatch" can include application capability binding information and/or application entity usage information, of the app entity of "stopwatch". In this non-limiting example, the app entity database can store a further entry for an app entity of "light" that is donated by an application other than the clock application.

In various implementations, an app entity (e.g., light) stored in the app entity database can have one or more statuses (e.g., active, inactive, being updated, error, etc.), and the dynamic application capability binding information of the app entity can indicate one or more actions the particular entity is capable of performing under the one or more statuses, respectively. Under different statuses, the same app entity may be capable of performing different actions. For example, dynamic application capability binding information of the app entity of "light" (when having an "active" status) can indicate that the app entity of "light" is currently capable of being turned off, being dimmed, changing a color or shining pattern, etc. The dynamic application capability binding information of the app entity of "light" (when having an "inactive" status) can indicate that the app entity of "light" is currently capable of being turned on, scheduled to be turned on, having configurations updated/modified, etc.

In various implementations, the application entity usage information for an app entity stored within the app entity database can include a usage history of the app entity, where the usage history of the app entity can include last access time, last modification time, one or more usage frequencies (e.g., usage counts/times within past 24 hours, within past week, within past month, etc.), and/or a full usage history, of the app entity. For example, application entity usage information for the app entity of "light" can indicate that the app entity of "light" is most recently turned on about 5 min ago, that the app entity of "light" is most recently turned off about 2 min ago, that the app entity of "light" is accessed on a daily basis, etc.

As a working example, a user can provide a verb-based succinct query of "pause" to a computing device (e.g., a cell phone) at which an automated assistant is installed. The verb-based succinct query (e.g., "pause") can include a verb that indicates an action or intent (e.g., "pause"), but can be void of any app entity in association with such action (or intent). Audio data capturing the verb-based succinct query of "pause" can be captured using one or more microphones of the computing device and can be processed using one or more components/engines (e.g., automatic speech recognition engine, etc.) The one or more components/engines can be included locally at the computing device (e.g., be included in an automated assistant installed locally at the computing device), or can be accessed remotely at a server device. For example, the automated assistant can include an automatic speech recognition (ASR) engine that is utilized to process the audio data capturing the verb-based succinct query of "pause", so as to generate a speech recognition of the verb-based succinct query of "pause" in natural language.

The automated assistant can further include a natural language understanding (NLU) engine, to determine semantic meaning(s) of the speech recognition of the verb-based succinct query (e.g., "pause") and decompose the determined semantic meaning(s) to determine intent(s) and/or parameter(s) for an action (e.g., assistant action). Given the speech recognition of the verb-based succinct query of "pause", the NLU engine can determine a natural language understanding (NLU) intent of "pause", but may be unable to determine/resolve parameter(s), such as an entity (in particular, an app entity) for the term "it", that are associated with the NLU intent of "pause". In some implementations, the NLU engine can generate multiple natural language understanding candidates for the verb-based succinct query of "pause", where the multiple natural language understanding candidates can include, for instance, a first natural language understanding candidate of "pause <timer>" and a second natural language understanding candidate of "pause <stopwatch>". In these implementations, the NLU engine may be unable to filter out entities (if any) with which the intent of "pause" cannot be realized.

To address the issues above, the automated assistant in various implementations of this disclosure can query the aforementioned app entity database based on the speech recognition and/or the natural language understanding output of the NLU engine, and thus work in concert with the NLU engine to resolve the parameter(s) associated with the determined NLU intent (which corresponds to the verb in the verb-based succinct query). Once the parameter(s) are resolved, the automated assistant can further include a fulfillment engine that receives the intent and/or the parameter(s) of the intent, to fulfill the intent by performing a corresponding assistant action (e.g., controlling a smart device, generating a text response, etc.). Optionally, the automated assistant can further include a text-to-speech (TTS) engine that converts a text response to a synthesized speech using a particular voice.

In the working example above where the verb-based succinct query of "pause" is received, in some cases, the NLU engine may generate multiple instance candidates (e.g., entity instance candidate and/or application instance candidate), such as "pause <clock instance>" and pause <music instance>. In this case, the app entity search engine can search the app entity database for one or more entities (e.g., app entities) associated with the intent of "pause" and the clock instance, and the app entity search engine can search the app entity database for one or more entities (e.g., app entities) associated with the intent of "pause" and the music instance. As described above, the app entity database can include, for instance, a plurality of app entities donated by applications (e.g., clocking application, music application, etc.) installed at one or more computing devices, where the plurality of app entities can include a first app entity (e.g., "alarm") donated by a first application (e.g., clock), a second app entity (e.g., timer) donated by the first application, a third app entity (e.g., stopwatch) donated by the first application, and a fourth app entity (e.g., song A) donated by a second application (e.g., music) that is different from the first application.

In the above example, the app entity search engine can search the app entity database based on a first search parameter that corresponds to the intent of "pause" and a second parameter that corresponds to the "clock instance", which results in a search result of app entities including the first app entity (e.g., "alarm"), the second app entity (e.g., timer), and the third app entity (e.g., stopwatch). The first app entity (e.g., "alarm"), the second app entity (e.g., timer), and the third app entity (e.g., stopwatch) are entities accessible with the first application (e.g., clock), and can be donated by the first application (e.g., clock) to the app entity database. The app entity search engine can search the app entity database based on the first search parameter that corresponds to the intent of "pause" and a third search parameter that corresponds to the "music instance", which results in a search result of app entities including the fourth app entity (e.g., song A) and a fifth app entity (e.g., song B).

To select an entity from the first, second, third, fourth, and fifth app entities (or ranking the first, second, third, fourth, and fifth app entities) for recommendation to user R of the computing device, the app entity search engine can further retrieve application capability binding information and/or application entity usage information of the first, second, third, fourth, and fifth app entities. It is noted that the application capability binding information and/or the application entity usage information can be, but does not necessarily need to be, stored within the app entity database.

In some implementations, the application capability binding information can include dynamic application capability binding information and/or static application capability binding information. The static application capability binding information of an app entity can indicate whether the app entity is capable of enabling performance of an action (e.g., indicated by the intent of "pause"). For example, given the intent of "pause", the first app entity (e.g., "alarm") can be filtered/excluded from being recommended to user R based on the static application capability binding information of the first app entity ("alarm") indicating that the first app entity ("alarm") cannot being paused (e.g., no pause function is available for app entity "alarm" with the clock application). Further, the static application capability binding information can indicate that the second app entity ("timer"), the third app entity ("stopwatch"), the fourth app entity ("song A"), and the fifth app entity (e.g., "song B") can each be paused (e.g., a pause function is available for each of these app entities via a corresponding application).

The dynamic application capability binding information indicates whether an app entity is capable of enabling performance of an action given a particular status of the app entity. For instance, when the dynamic application capability binding information indicates that the second app entity ("timer") has an active status and the third app entity ("stopwatch") has an inactive status, the second app entity can be determined as being capable of being "paused", while the third app entity can be filtered/excluded from being recommended to user R based on fact that an inactive stopwatch cannot be paused. Similarly, when the dynamic application capability binding information indicates that the fourth app entity ("song A") has an active status (e.g., being played) and the fifth app entity ("song B") has an inactive status (e.g., not being played), the fourth app entity ("song A") is determined as can be paused, while the fifth app entity ("song B") is determined as cannot be paused. This would reduce the number of candidates for app entity in association with the intent of "pause" from 5 (e.g., "alarm", "timer", "stopwatch", "song A", "song B") to 3 ("timer", "stopwatch", "song A").

In some implementations, based on the intent of "pause" and based on the app entities ("timer", "stopwatch", "song A") determined as being in associated with the intent of "pause" using the application capability binding information, the fulfillment engine can generate an assistant output responsive to the spoken utterance of "pause". Based on the assistant output, textual content (e.g., a prompt) such as "Which would like to pause, timer, stopwatch, or song A?" can be generated and rendered audibly and/or visually to user R, via the computing device. This way, even if a user provides an incomplete or inadequate query (e.g., the verb-based succinct query void of any app or app entity).

In some implementations, to further reduce or eliminate the need for providing the prompt (responsive to the incomplete query) to seek further user input or clarification (when more than one app entity is determined after app entity filtration using the application capability binding information) to understand the incomplete query, application entity usage information (e.g., for the app entities of "timer", "stopwatch", "song A") can be retrieved, e.g., from the app entity database. For example, the application entity usage information of app entity "timer" can indicate that "timer" corresponds to a low likelihood of being paused, the application entity usage information of app entity "stopwatch" can indicate that "stopwatch" has never been paused before, and the application entity usage information of app entity "song A" can indicate that "song A" has been paused multiple times (which satisfies a threshold number of times, e.g., 5 times) at a certain percentage of progress (e.g., at 2:00 min out of the total length of 3:30 min, for the user to practice singing a particular portion of song A), the app entities "timer", "stopwatch", "song A" can be ranked in the following order: "song A", "timer", and "stopwatch". In this case, instead of providing the aforementioned prompt such as "Which would like to pause, timer, stopwatch, or song A?", the fulfillment engine can process NLU output indicating the intent of "pause" and app entity of "song A", to generate fulfillment data that causes the fifth app entity of "song A" to be paused.

In some implementations, the fulfillment data can alternatively or additionally cause an audible or textual response ("song A is paused, say "continue" to continue the play of song A") to be rendered in response to the incomplete query. This way, repeated attempts by the user in providing an appropriate query that can trigger a particular application (e.g., music application) that provides access to the desired entity (e.g., "song A") to perform an action of "pause" on the desired entity of "song A" can be avoided or reduced. This can lead to reduced consumption of computing and/or battery resources. It is noted that the order of retrieving application capability binding information and retrieving application entity usage information can be reversed. In some implementations, given an app entity, the retrieval of application capability binding information and application entity usage information can be based on availability of the application capability binding information and retrieving application entity usage information.

As another practical example, a user query of "turn back on" can be received from a client device, and audio data capturing the user query of "turn back on" can be processed to determine a natural language intent of "turn back on" and one or more instance candidates. The one or more instance candidate can include: a first instance candidate of "turn <clock instance> back on" and a second instance candidate of "turn <light instance> back on". Based on determined "clock instance" and "light instance", the app entity database can be queried to determine a plurality of app entities, including: a first app entity of "alarm" corresponding to the first instance candidate of "turn <clock instance> back on", a second app entity of "timer" corresponding to the first instance candidate of "turn <clock instance> back on", and a third app entity of "light" that corresponds to the second instance candidate of "turn <light instance> back on".

In the above practical example, the app entity database can be further queried to retrieve app capability binding information and/or app entity usage information for the first app entity of "alarm", the second app entity of "timer", and the third app entity of "light". Based on the retrieved app capability binding information and/or app entity usage information, the first app entity of "alarm", the second app entity of "timer", and the third app entity of "light" can be ranked.

For instance, the app entity usage information can indicate that the first app entity of "alarm" was turned off within a temporal threshold (e.g., 5 minutes ago), while the second app entity of "timer" and the third app entity of "light" were turned off beyond the temporal threshold (e.g., the second app entity of "timer" was turned off 10 min ago, and the third app entity of "light" was turned off half hour ago). In this instance, the first app entity of "alarm", the second app entity of "timer", and the third app entity of "light" can be ranked, based on a temporal order of "5 min"<"10 min"<"half hour", in a ranking order of: the first app entity of "alarm", the second app entity of "timer", and the third app entity of "light". The top ranked app entity (e.g., the first app entity of "alarm") can be processed using the fulfillment engine, along with the intent of "turn back on", to generate fulfillment data that causes the alarm to be turned back on.

In some implementations, the app capability binding information can be further retrieved for the first app entity of "alarm", the second app entity of "timer", and the third app entity of "light". The retrieved app capability binding information can indicate that a current status (or an associated property) of the first app entity of "alarm" is "unavailable", that a current status (or an associated property) of the second app entity of "timer" is "inactive", and that a current status (or an associated property) of the third app entity of "light" is "inactive". In this case, the first app entity of "alarm" can be excluded from being recommended, and the rest app entities (the second app entity of "timer", and the third app entity of "light") can be ranked, where the second app entity of "timer" is ranked higher than the third app entity of "light". Based on such ranking, the second app entity of "timer" can be turned back on, i.e., change from "inactive" to "active". Using techniques described herein, when a user turns off a timer (or other app entity) in the clock application (or other application) and wants to later turn it back on, instead of opening the clock application, finding the specific alarm instance, and turning it back on, the user can simply say or type a verb-based succinct query of "turn back on". The fewer interaction between the user and the application could result in reduced consumption of computing resources, battery resources, and/or network resources, while enhancing user experience by providing a response and/or performing a desired action in an efficient manner.

In some implementations, the aforementioned temporal order of app entity candidates, temporal threshold, and the intent (e.g., "pause", "turn back on", etc.) can be processed using a trained model, such as a classifier or large language model, to generate a corresponding model output. Based on the model output, a control signal or textual response can be generated in response to the verb-based succinct query (e.g., "pause", "turn back on", etc.).

In various implementations, a method is provided, where the method includes: receiving, via a client device, audio data capturing a user query; processing the audio data to determine that the user query is a verb-based succinct query that includes an action but not includes any entity to perform the action; determining, based on the verb-based succinct query, one or more entities; retrieving usage information of the one or more entities; determining capability information of the one or more entities; and selecting, based on the usage information and the capability information, a particular entity of the one or more entities.

In some implementations, the method can further include: generating a complete user query that includes the verb-based succinct query and the particular entity; and processing the complete user query, using a generative model, to generate a response responsive to the verb-based succinct query. Alternatively or additionally, the method can further include: causing the action to be performed based on the selected particular entity and the verb-based succinct query.

In some implementations, the one or more entities are determined from an entity database (e.g., the aforementioned app entity database) storing a plurality of in-app entities donated by one or more applications installed at the client device. As a non-limiting example, the one or more entities can be clock entities accessible via a clock application, where the clock entities can include a timer, an alarm, and a stopwatch.

In some implementations, the capability information of the one or more entities is determined from the entity database that further stores capability information for the plurality of in-app entities.

In some implementations, the entity database is included locally in the client device.

In some implementations, the entity database further stores the usage information including: a last access time, a last modification time, a usage frequency, and/or a full usage history.

In some implementations, the capability information includes static capability information indicating whether any of the one or more entities is capable/incapable of enabling performance of the action. Additionally or alternatively, in some implementations, the capability information includes dynamic capability information indicating whether a current status (or other dynamic properties) for each of the one or more entities enables a respective entity of the one or more entities to perform the action or have the action performed.

In some implementations, the current status for each of the one or more entities corresponds to an active status or inactive status.

The above is provided merely as an overview of some implementations. Those and/or other implementations are disclosed in more detail herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

The above and other aspects, features, and advantages of certain implementations of the present disclosure will be more apparent from the following description taken in conjunction with the accompanying drawings. In the drawings.

DETAILED DESCRIPTION

The following description with reference to the accompanying drawings is provided for understanding of various implementations of the present disclosure. It is appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used to enable a clear and consistent understanding of the present disclosure. Accordingly, it should be apparent to those skilled in the art that the following description of various implementations of the present disclosure is provided for the purpose of illustration only and not for the purpose of limiting the present disclosure as defined by the appended claims and their equivalents.

Figure 1:
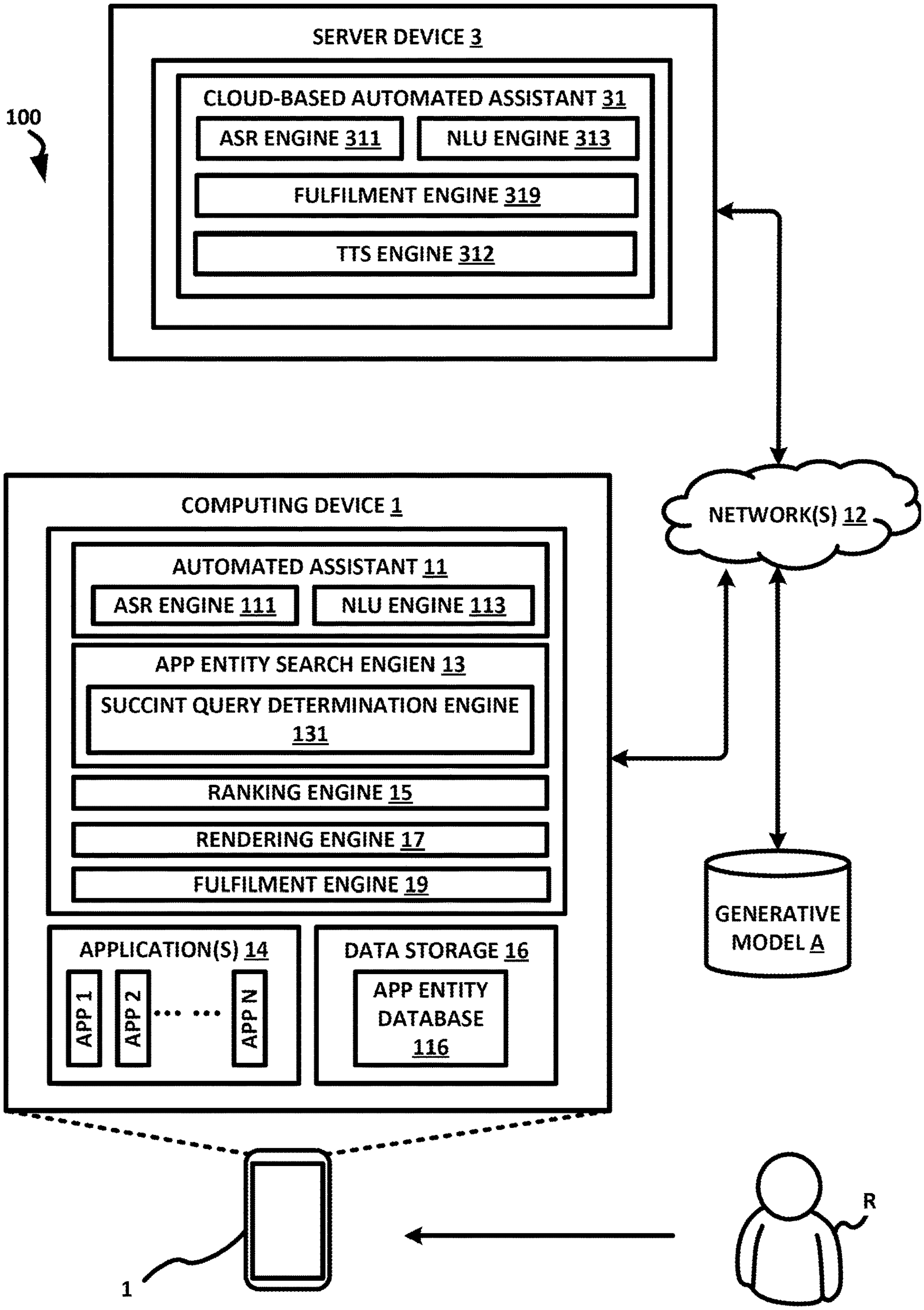
FIG. 1 depicts a block diagram of an example environment that demonstrates various aspects of the present disclosure, and in which implementations disclosed herein may be implemented.

FIG. 1 depicts a block diagram of an example environment 100 that demonstrates various aspects of the present disclosure, and in which implementations disclosed herein may be implemented. As shown in FIG. 1, the example environment 100 can include: a computing device 1, and a server device 3 in communication with the computing device 1. The server device 3 can be in communication with the computing device 1 via one or more networks 12. The computing device 1 (may also be referred to as "client device", "user device" or "local device") can be, for example, a cell phone, a laptop, a desktop, a notebook computer, a tablet, a smart TV, a messaging device, or a personal digital assistant (PDA), and the present disclosure is not limited thereto.

In various implementations, the computing device 1 can include a local automated assistant 11, one or more applications 14, and/or a data storage 16. The computing device 1 can further include one or more user interface input devices (not shown) such as a keyboard, pointing devices such as a mouse, trackball, touchpad, or graphics tablet, a scanner, a touch screen incorporated into the display, audio input devices such as voice recognition systems, microphones, and/or other types of input devices. The computing device 1 can further include one or more user interface output devices such as a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display (e.g., audio data) via audio output devices. In various implementations, the computing device 1 can further include an app entity search engine 13. In various implementations, the computing device 1 can further include: a ranking engine 15, a rendering engine 17, and/or a fulfillment engine 19.

The one or more applications 14 can include, for example, app 1 (e.g., a social media application), app 2 (e.g., a music application), . . . , and app N (e.g., a clock application). The data storage 16 can include, for example, an app entity database 116 storing one or more app entities (sometimes referred to as "in-app entities") donated by the one or more applications 14 (or a portion thereof).

In various implementations, the local automated assistant 11 installed at the computing device 1 can include a plurality of local components including an automatic speech recognition (ASR) engine 111, a text-to-speech (TTS) engine (not shown), a natural language understanding (NLU) engine 113, and/or a fulfillment engine (e.g., 19 in FIG. 1). In various implementations, the local automated assistant 11 installed at the computing device 1 can be in communication with a cloud-based automated assistant 131, where the cloud-based automated assistant 131 can include cloud-based components the same as or similar to the plurality of local components of the local automated assistant 11 locally installed at the computing device 1. For example, the cloud-based automated assistant 131 can include a cloud-based ASR engine 311, a cloud-based NLU engine 313, a cloud-based fulfillment engine 319, and/or a cloud-based TTS engine 312. The local automated assistant 11 and the cloud-based automated assistant 131 can be referred to as "automated assistant".

The ASR engine 111 (and/or the cloud-based ASR engine 311) can process, using one or more streaming ASR models (e.g., a recurrent neural network (RNN) model, a transformer model, and/or any other type of ML model capable of performing ASR), streams of audio data that capture spoken utterances and that are generated by microphone(s) of the client device 110 to generate corresponding streams of ASR output. Notably, the streaming ASR model can be utilized to generate the corresponding streams of ASR output as the streams of audio data are generated.

The NLU engine 113 and/or the cloud-based NLU engine 313 can process, using one or more NLU models (e.g., a long short-term memory (LSTM), gated recurrent unit (GRU), and/or any other type of RNN or other ML model capable of performing NLU) and/or grammar-based rule(s), the corresponding streams of ASR output to generate corresponding streams of NLU output. The fulfillment engine 19 and/or the cloud-based fulfillment engine 319 can cause the corresponding streams of NLU output to be processed to generate corresponding streams of fulfillment data. The corresponding streams of fulfillment data can correspond to, for example, corresponding given assistant outputs that are predicted to be responsive to spoken utterances captured in the corresponding streams of audio data processed by the ASR engine 111 (and/or the cloud-based ASR engine 311).

The TTS engine (e.g., 312) can process, using TTS model(s), corresponding streams of textual content (e.g., text formulated by the automated assistant 11) to generate synthesized speech audio data that includes computer-generated synthesized speech. The corresponding streams of textual content can correspond to, for example, one or more given assistant outputs, one or more of modified given assistant outputs, and/or any other textual content described herein. The aforementioned ML model(s) can be on-device ML models that are stored locally at the computing device 1, remote ML models that are executed remotely from the computing device (e.g., at remote server device 3), or shared ML models that are accessible to both the computing device 1 and/or remote systems (e.g., the remote server device 3). In additional or alternatively implementations, corresponding streams of synthesized speech audio data corresponding to the one or more given assistant outputs, the one or more of modified given assistant outputs, and/or any other textual content described herein can be pre-cached in memory or one or more databases accessible by the computing device 1, such that the automated assistant need not use the TTS engine 312 to generate the corresponding synthesized speech audio data.

In various implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 111 and/or 311 can select one or more of the ASR hypotheses as corresponding recognized text that corresponds to the spoken utterance(s) (e.g., selected based on the corresponding predicted measures).

In various implementations, the corresponding streams of NLU output can include, for example, streams of annotated recognized text that includes one or more annotations of the recognized text for one or more (e.g., all) of the terms of the recognized text, one or more corresponding predicted measures (e.g., probabilities, log likelihoods, and/or other values) for NLU output included in the streams of NLU output, and/or other NLU output. For example, the NLU engine 113 and/or 313 may include a part of speech tagger (not depicted) configured to annotate terms with their grammatical roles. Additionally, or alternatively, the NLU engine 113 and/or 313 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database (e.g., the app entity database 115 in FIG. 1) to resolve a particular entity.

Additionally, or alternatively, the NLU engine 113 and/or 313 may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine 113 and/or 313 may rely on annotations from one or more other components of the NLU engine 113 and/or 313. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the computing device 1, the one or more additional client devices, and/or any other computing devices of the user can form an ecosystem of devices that can employ techniques described herein. These additional client devices and/or computing devices may be in communication with the computing device 1 (e.g., over the network (s) 12). As another example, the computing device 1 can be utilized by multiple users in a shared setting (e.g., a group of users, a household). For example, multiple users co-located in a household may each utilize the computing device 1, and each of the multiple users may have a separate automated assistant account that is personal to each of the multiple users. In these examples, the automated assistant can utilize one or more user identification techniques described herein to identify a given user, from among the multiple users, and tailor any dialog session accordingly by utilizing a given persona that the given user assigned to the automated assistant (e.g., which may differ from another persona assigned to the automated assistant by another one of the multiple users), utilizing information that is specific to the given user (e.g., calendar information for the given user, mobile device information from a mobile device of the given user (e.g., incoming electronic communications directed to the given user), etc.), and/or other information to tailor the dialog session to the given user.

As a working example, the computing device 1 can receive audio data capturing a verb-based succinct query from a user R, and the audio data capturing the verb-based succinct query can be processed using the ASR engine 111 to generate a transcription (i.e., speech recognition) of the verb-based succinct query. The NLU engine 113 can process the transcription of the verb-based succinct query to determine an intent and/or parameter(s) associated with the intent, for performing a corresponding assistant action. For example, when the user R provides an utterance of "pause", the NLU engine 113 can determine an intent of "pause", and a clock application (and/or other applications) associated with the intent of "pause". However, the clock application can include a plurality of clock app entities (e.g., timer, stopwatch, clock, and alarm), and the NLU engine 113 may not be able to determine which one of the plurality of clock app entities (e.g., timer, stopwatch, clock, and alarm) is selected to perform the assistant action of "pause". In this case, the app entity search engine 13 can access the app entity database 116 for application capability binding information (static and/or dynamic) and/or application entity usage information, associated with each of the plurality of clock app entities (e.g., timer, stopwatch, clock, and alarm).

For example, the app entity search engine 13 can retrieve, from the app entity database 116, static application capability binding information that indicates the clock and alarm cannot be paused and dynamic application capability binding information that indicates the timer is active so that the timer can be paused and the stopwatch is inactive so that the stopwatch cannot be paused. Based on the application capability binding information, the app entity search engine 13 can return a search result of "timer", based on which the NLU engine 113 can determine a candidate of "pause <timer>" for the verb-based succinct query. In this instance, the fulfillment engine 19 can cause the timer to be paused based on the candidate of "pause <timer>".

As another example, the app entity search engine 13 can retrieve, from the app entity database 116, static application capability binding information that indicates the clock and alarm cannot be paused and dynamic application capability binding information that indicates the timer is active so that the timer can be paused and the stopwatch is also active so that the stopwatch can also be paused. In this case, the app entity search engine 13 can further retrieve application entity usage information for the clock app entity "timer" and the clock app entity "stopwatch". If the application entity usage information indicates that the user R has paused the clock app entity "timer" and has not paused the clock app entity "stopwatch", the app entity search engine 13 can rank the clock app entity "timer" higher than the clock app entity "stopwatch", using the ranking engine 15. In this case, the NLU engine 113 can rank a candidate of "pause <timer>" higher than a candidate of "pause <stopwatch>", for the verb-based succinct query. Correspondingly, the fulfillment engine 19 can cause the timer, instead of the stopwatch, to be paused.

In some implementations, it is noted that a classifier or a generative model A can be applied to process the NLU output and the application entity usage information (and/or the application capability binding information), or to process the NLU output and information derived from the application entity usage information (and/or the application capability binding information). As a non-limiting example, a model input can be generated to include the NLU output and the temporal order (and/or the temporal threshold) as described in other aspects of this disclosure, where the model input can be processed using the classifier (or generative model A), to generate a model output based on which a response to the verb-based succinct query can be generated or derived.

Figure 2A:
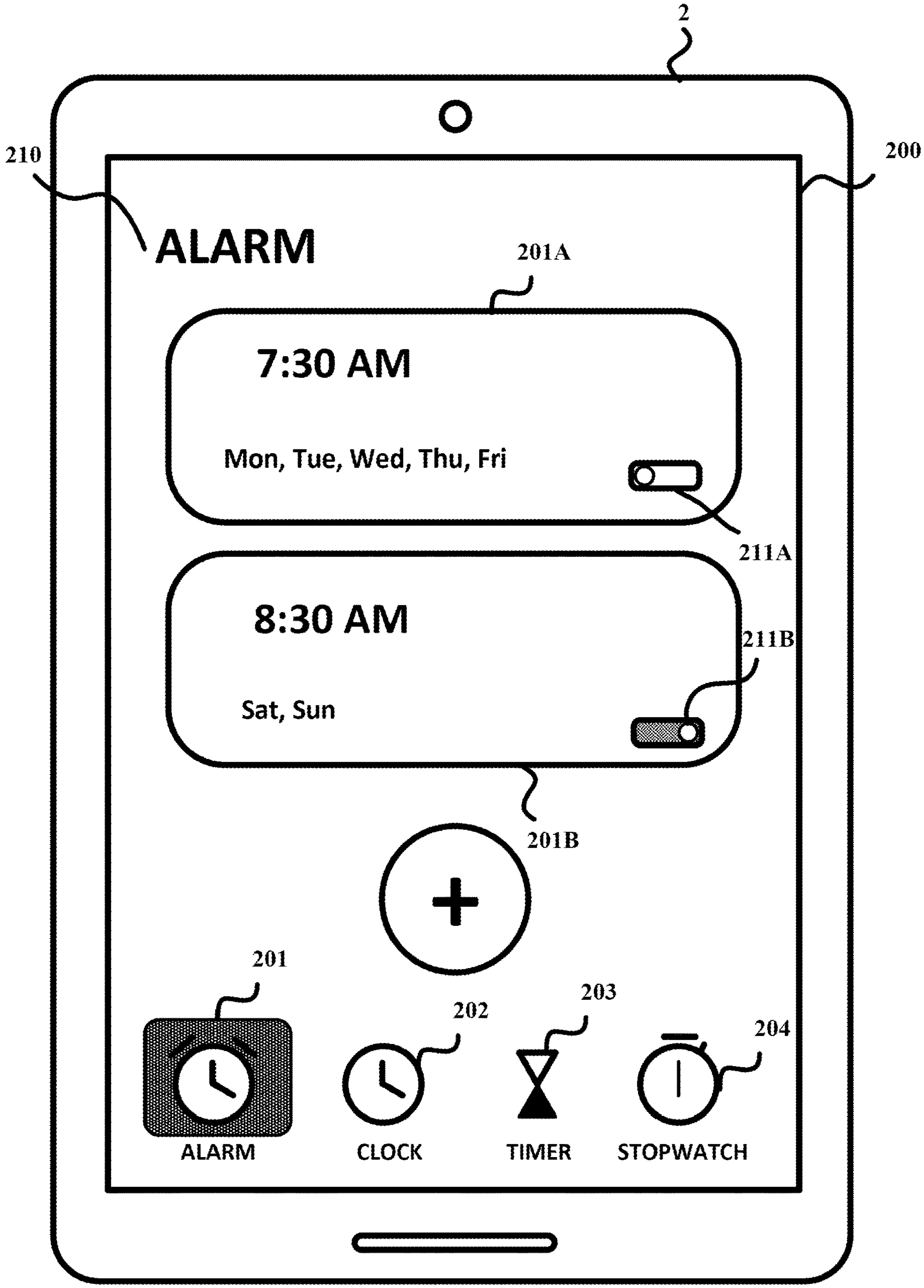
FIG. 2A illustrates a graphical user interface of a clock application that shows one or more app entities donated to an app entity database, in accordance with various implementations.

FIG. 2A illustrates a non-limiting example of a graphical user interface 200 of a client device 2 relating to a clock application 210, where one or more app entities accessible via the clock application are donated to an app entity database, in accordance with various implementations. The graphical user interface 200 of the clock application can include a plurality of app entities, e.g., a first app entity 201 of "alarm", a second app entity 202 of "clock", a third app entity 203 of "timer", and a fourth app entity 204 of "stopwatch". In some implementations, as a non-limiting example shown in FIG. 2A, the clock application can be used to create one or more clock instances for the first app entity of "alarm", such as a first clock instance 201A of "alarm 1" and a second clock instance 201B of "alarm 2", where "alarm 1" can be set for 7:30 AM each Monday to Friday and has an "inactive" status indicated by a first status indicator 211A and "alarm 2" can be set for 8:30 AM each Saturday and Sunday and has an "active" status indicated by a second status indicator 211B.

Figure 2B:
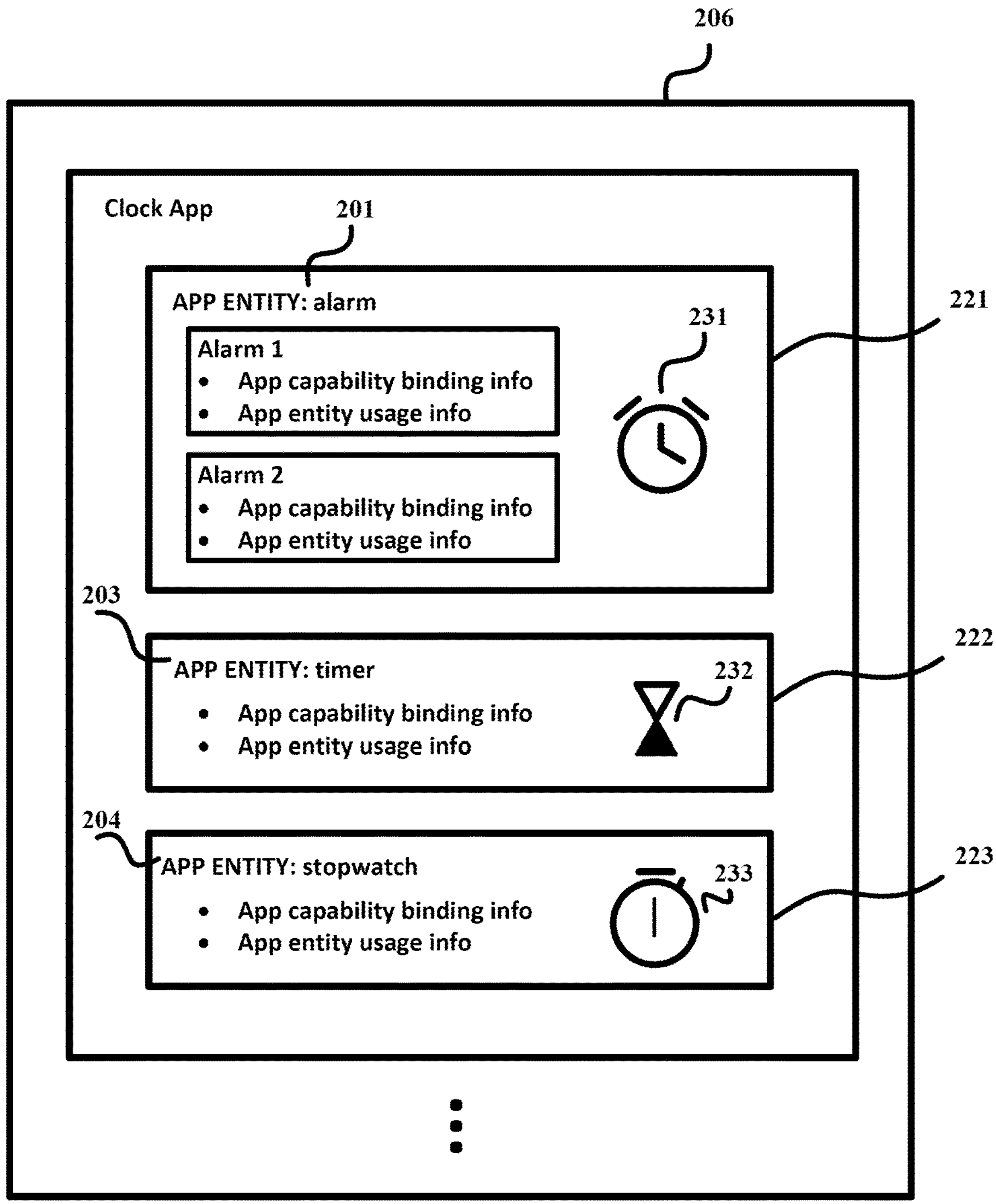
FIG. 2B illustrates an example of an app entity database, in accordance with various implementations.

FIG. 2B illustrates an example of an app entity database, in accordance with various implementations. The app entity database 206 can include a plurality of app entities donated by one or more applications. As a non-limiting example shown in FIG. 2B, the app entity database can include a first entry 221 for the first app entity 201 of "alarm", a second entry 222 for the third app entity 203 of "timer", and a third entry 223 for the fourth app entity 204 of "stopwatch". The first app entity 201 of "alarm", the third app entity 203 of "timer", and the fourth app entity 204 of "stopwatch" can all be donated by the clock application to the app entity database 206. The first entry 221 can include two alarms (e.g., alarm 1 and alarm 2) that correspond to the first app entity 201 of "alarm", where the first entry 221 stores app capability binding information and/or app entity usage information for both alarm 1 and alarm 2. The first entry 221 can further include an alarm symbol 231 representing the first app entity 201 of "alarm" within the clock application.

The second entry 222 can be for the third app entity 203 of "timer" accessible via the clock application, and stores app capability binding information and/or app entity usage information for the timer. The second entry 222 can further include a timer symbol 232 representing the third app entity 203 of "timer" within the clock application. The third entry 223 can be for the fourth app entity 204 of "stopwatch" accessible via the clock application, and stores app capability binding information and/or app entity usage information for the stopwatch. The third entry 223 can further include a stopwatch symbol 233 representing the fourth app entity 203 of "stopwatch" within the clock application. It is noted that the app entity database 206 can further include other app entities donated by applications other than the clock application. Entries of the app entity database 206 can include information other than the app capability binding information, the app entity usage information, and the app entity symbol.

It is noted that, in some implementations, as shown in FIG. 2B, no entry is created in the app entity database for the second app entity 202 of "clock", which typically cannot be manipulated by a human user (e.g., no action such as "pause" or "stop" is available to be performed to change a status of the second app entity 202 of "clock").

Figure 3:
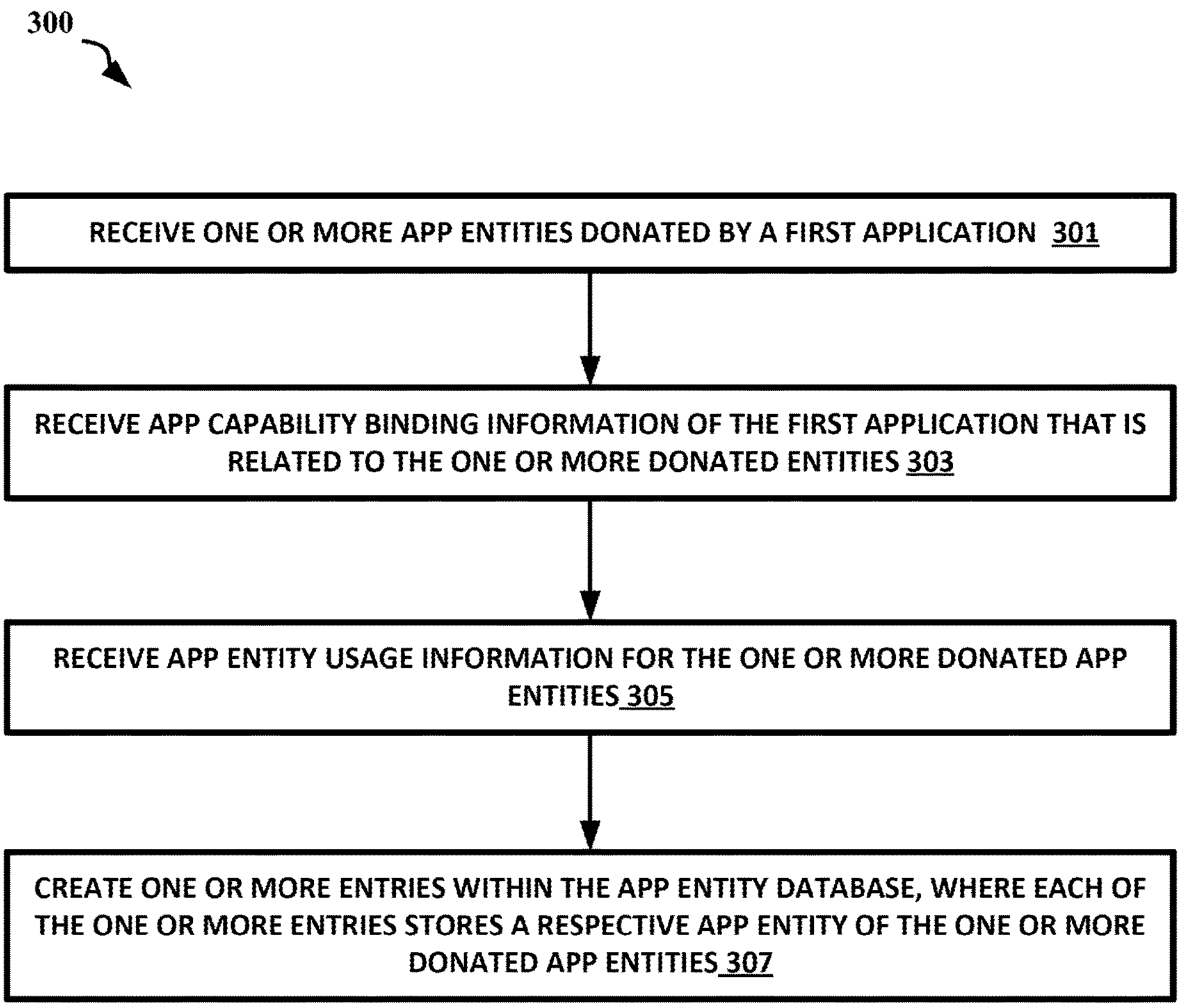
FIG. 3 illustrates an example method for collecting entries for an app entity database, in accordance with various implementations.

FIG. 3 illustrates an example method 300 for establishing an app entity database, in accordance with various implementations. For convenience, the operations of the method 300 are described with reference to a system that performs the operations. The system of the method 300 includes one or more processors and/or other component(s) of a client device (e.g., computing device 1 in FIG. 1) and/or of a server device. Moreover, while operations of the method 300 are shown in a particular order, this is not meant to be limiting. One or more operations may be reordered, omitted, or added.

Referring to FIG. 3, in various implementations, at block 301, the system can receive one or more app entities donated by a first application. The one or more app entities donated by the first application can be accessible (and sometimes only accessible) via the first application. The first application, for instance, can be a clock application, and the one or more app entities can be of different types and can include, for instance, a timer, a stopwatch, and an alarm. It is noted that, in some implementations, the one or more app entities can include multiple app entities of the same type. For instance, the one or more app entities can include a first alarm and a second alarm, both accessible via an alarm module of the clock application. The first alarm and the second alarm can have the same or different statuses. As a non-limiting example, the first alarm can be active while the second alarm can be inactive.

In various implementations, at block 303, the system can receive (or determine) app capability binding information of the first application that is related to the one or more donated entities. The app capability binding information of the first application can include static app capability binding information that indicates whether the one or more donated app entities (and/or other app entities not donated) accessible via the first application are capable of performing one or more actions. Additionally or alternatively, the app capability binding information of the first application can include dynamic app capability binding information that indicates varied Capability of the one or more donated app entities (and/or other app entities not donated) in performing one or more actions under one or more status of the one or more donated app entities (and/or other app entities not donated). For example, the dynamic app capability binding information can indicate that the app entity of "timer" is capable of being paused when the status of the app entity of "timer" is active and indicate that the app entity of "timer" is incapable of being paused when the status of the app entity of "timer" is inactive or already paused.

In various implementations, at block 305, the system can receive (or determine) app entity usage information for the one or more donated app entities. The app entity usage information, for instance, can indicate last access time, last modification time, usage frequency, and/or a full usage history for each of the one or more donated app entities. As a non-limiting example, the app entity usage information can indicate that the timer has been turned off, e.g., 5 minutes ago.

In various implementations, at block 307, the system can create one or more entries within the app entity database, where each of the one or more entries stores a respective app entity of the one or more donated app entities. The app capability binding information relating to the respective app entity can be stored in a corresponding entry, or can be stored in associated with the respective app entity of the corresponding entry. The app entity usage information relating to the respective app entity can be stored in a corresponding entry, or can be stored in associated with the respective app entity of the corresponding entry.

In various implementations, the system can further receive (or determine) updated app entity usage information or updated app capability binding information for a respective app entity stored within the app entity database. In various implementations, the system can update the app entity database based on the updated app entity usage information or updated app capability binding information for a respective app entity.

Figure 4:
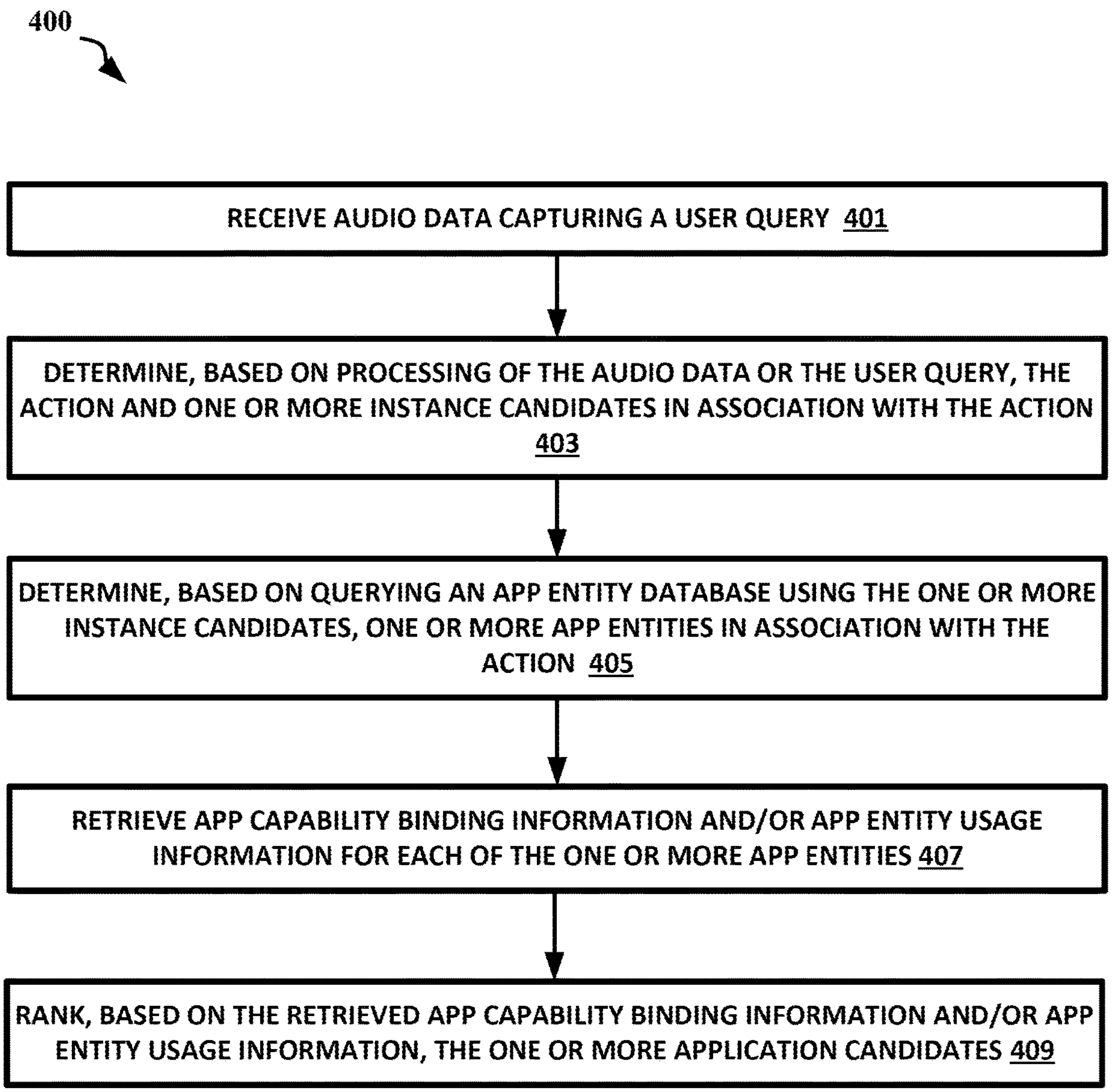
FIG. 4 illustrates another example method for querying an app entity database, in accordance with various implementations.

FIG. 4 illustrates an example method for searching an app entity database based on a user query, in accordance with various implementations. For convenience, the operations of the method 400 are described with reference to a system that performs the operations. The system of the method 400 includes one or more processors and/or other component(s) of a client device (e.g., computing device 1 in FIG. 1) and/or of a server device. Moreover, while operations of the method 400 are shown in a particular order, this is not meant to be limiting. One or more operations may be reordered, omitted, or added.

Referring to FIG. 4, in various implementations, at block 401, the system can receive audio data capturing a user query that includes an action and is void of an app entity in association with the action. As a non-limiting example, the system can receive, via a client device and from a user, audio data capturing a user query of "turn it back on" which includes an action of "turn . . . back on" but a term of "it" does not explicitly provide an app entity that enables the action.

In various implementations, at block 403, the system can determine, based on processing of the audio data or the user query, the action and one or more instance candidates in association with the action. For example, the system can process the audio data (e.g., using a ASR engine) to recognize a transcription of the user query, and then use a natural language understanding (NLU) engine to determine a natural language intent that corresponds to the action, as well as one or more instance candidates (or application candidates) to realize the natural language intent. Continuing with the non-limiting example above, the natural language understanding (NLU) engine can process the transcription of the user query (i.e., "turn it back on" in natural language) to determine a natural language intent of "turn . . . back on" and one or more instance candidates: "turn <clock instance> back on" and "turn <light instance> back on".

In various implementations, at block 405, the system can determine, based on querying an app entity database using the one or more instance candidates, one or more app entities (or sometimes referred to as "app entity candidates") in association with the action. Continuing with the non-limiting example above, the system can query the app entity database for app entities corresponding to the "clock instance" and that correspond to the "light instance". The query can result in identification of one or more app entity candidates that include: an alarm, a timer, and a light, where the app entity of "alarm" and app entity of "timer" correspond to the "clock instance" (i.e., can be accessed via the clock application) and where the app entity of "light" corresponds to the "light instance" (i.e., can be accessed via the lighting application). It's noted that the number of the identified app entities can be different from the number of the determined instance candidates. For example, the number of the identified app entities can be greater than the number of the determined instance candidates.

In various implementations, at block 407, the system can retrieve app capability binding information and/or app entity usage information for each of the one or more app entity candidates. For example, the system can retrieve app capability binding information and/or app entity usage information from an app entity database storing a plurality of app entities. Continuing with the non-limiting example above, the app entity database can include app entity usage information indicating that the alarm was turned off within a temporal threshold (e.g., the past 5 minutes), while the timer and the light were turned off beyond the temporal threshold.

In various implementations, at block 409, the system can rank, based on the retrieved app capability binding information and/or app entity usage information, the one or more application candidates. Continuing with the non-limiting example above, based on the app entity usage information indicating that the alarm was turned off within a temporal threshold (e.g., the past 5 minutes) while the timer and the light were turned off beyond the temporal threshold, the candidate of "alarm" can be ranked higher than candidates of "timer" and "light". If the app entity usage information further indicates that while the timer and the light were turned off beyond the temporal threshold, the timer was turned off earlier than the light (e.g., the timer was turned off half hour ago, the light was turned off half day ago), the candidate of "timer" can be ranked higher than the candidate of "light". In this case, the candidates of "alarm", "timer", and "light" can be ranked based on a temporal order indicating an order for the time each of the candidates (alarm, timer, light) was most recently turned off.

In various implementations, the system can further select, based on the ranked one or more application candidates, a particular application candidate to realize the natural language intent. Continuing with the non-limiting example above, the system can select the top ranked candidate, i.e., "alarm", to realize the natural language intent of "turn . . . back on". In this example, the system can further cause the alarm to turn back on.

Alternatively, in some implementations, the system can generate a prompt of "do you want to turn the alarm back on?" and cause the alarm to turn back on in response to receiving a confirmation from the user that confirms to turn the alarm back on, as a reply to the prompt. In some implementations, the prompt can be generated using a large language model (LLM), where the large language model can be a trained machine learning model, such as a trained generative model that optionally has a transformer based architecture. In some implementations, a large language model input can be generated based on the aforementioned temporal threshold and the aforementioned temporal order. Continuing with the non-limiting example above, the system can determine that the large language model input be, for instance, "turn back on one of the following application entities: alarm which was turned off within a temporal threshold of 5 min, timer which was turned off half hour ago, and light which was turned off half day ago," or "turn back on one of the following application entities: alarm, timer, and light, where alarm was turned off most recently and light was turned off least recently." Such large language model input can be processed, using the LLM, to generate a natural language model output, based on which the prompt such as "do you want to turn the alarm back on?" can be generated.

Figure 5:
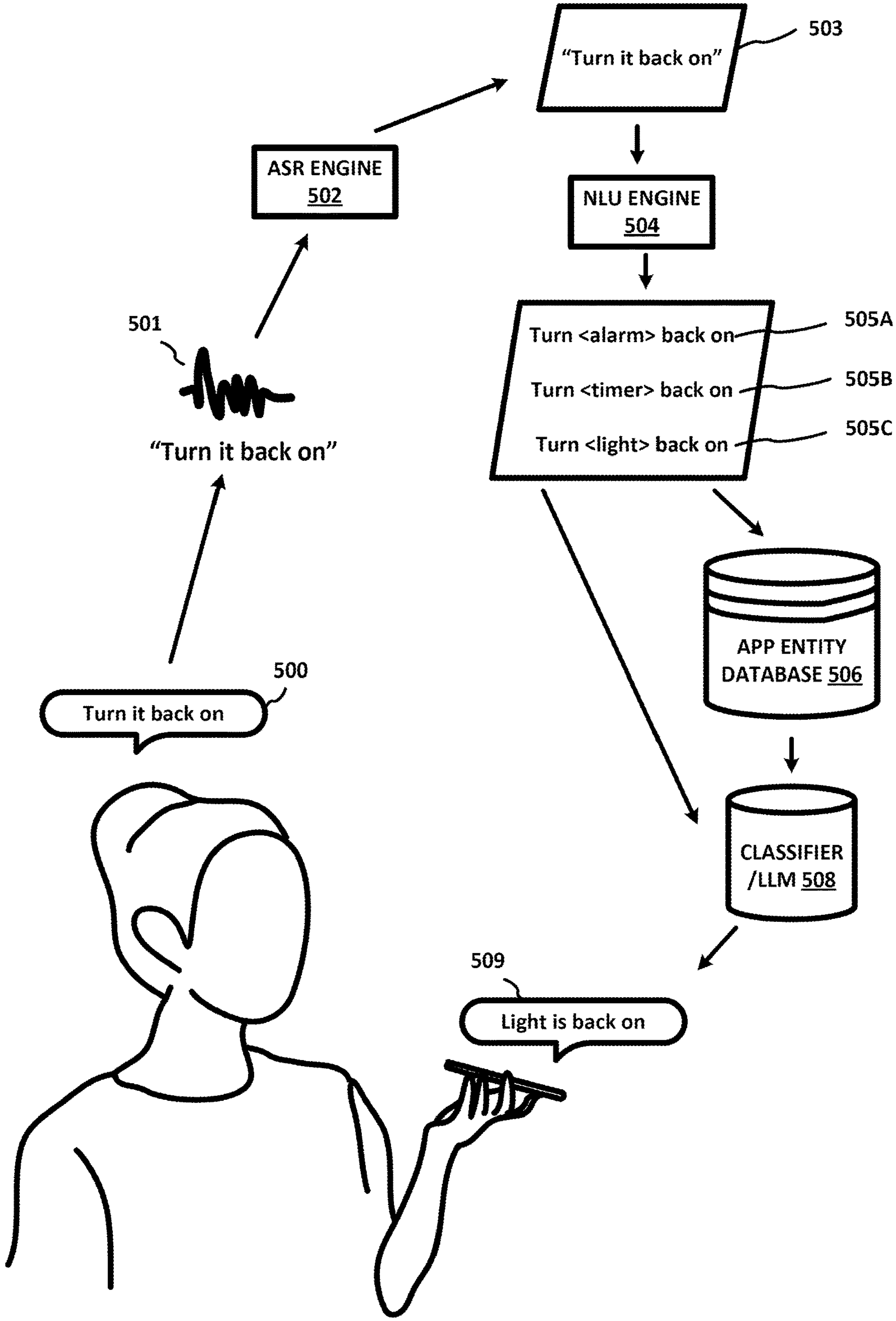
FIG. 5 illustrates a flowchart showing utilization of an app entity database in responding to a verb-based succinct query, in accordance with various implementations.

FIG. 5 illustrates a flowchart showing utilization of an app entity database in response to receiving a verb-based succinct query, in accordance with various implementations. As shown in FIG. 5, a user can provide a spoken utterance 500 of "turn it back on" (or "turn back on") to a client device 510 of the user. Audio data 501 capturing the spoken utterance 500 can be received via one or more microphones of the client device 510, and be processed using an ASR engine 502 that is installed at (or accessible via) the client device 510. The ASR engine 502 can process the audio data 501, to generate a transcription 503 (i.e., "turn it back on" in natural language) of the audio data 501.

The client device 510 can further include (or access) a NLU engine 504 that processes the transcription 503 to determine a natural language intent of "turn . . . back one" and one or more app entity candidates (e.g., "alarm", "timer", and "light") for the natural language intent. Alternatively or additionally, the NLU engine 504 can generate a plurality of natural language understanding candidates for the spoken utterance 500 of "turn it back on". The plurality of natural language understanding candidates can include a first natural language understanding candidate 505A of "turn <alarm> back on", a second natural language understanding candidate 505B of "turn <timer> back on", and a third natural language understanding candidate 505C of "turn <light> back on". It's noted that, the "alarm", "timer", and "light" here are app entities accessible within one or more applications (e.g., a clock application and a smart light application). In some implementations, instead of generating natural language understanding candidates for app entities, the plurality of natural language understanding candidates can be for app instances (e.g., a clock instance which can correspond to a timer instance or an alarm instance, etc.), including, for instance, a candidate of "turn <clock instance> back on" and an additional candidate of "turn <light instance> back on". The present disclosure, however, is not limited to descriptions herein.

Based on the one or more app entity candidates (e.g., "alarm", "timer", and "light") determined by the NLU engine 504, the app entity database 506 can be queried to retrieve application capability binding information and/or application entity usage information. As a practical example, application entity usage information for the app entity candidate of "light" can be retrieved from the app entity database 506, where the application entity usage information for the app entity candidate of "light" indicates that alarm was turned off 4 min ago, which is within a temporal threshold of 5 min. Application entity usage information for the app entity candidate of "timer" can be retrieved from the app entity database 506, where the application entity usage information for the app entity candidate of "timer" indicates that alarm was turned off 8 min ago, which is also beyond the temporal threshold of 5 min. Application entity usage information for the app entity candidate of "alarm" can be retrieved from the app entity database 506, where the application entity usage information for the app entity candidate of "alarm" indicates that alarm was turned off two days ago, which is beyond the temporal threshold of 5 min.

In the above practical example, the one or more app entity candidates (e.g., "alarm", "timer", and "light") or the one or more natural language understanding candidates (e.g., 505A, 505B, 505C) can be ranked based on a temporal order (e.g., 4 min is more recent than 8 min, and 8 min is more recent than two days) indicated by the application entity usage information for the one or more app entity candidate that is retrieved from the app entity database 506. That is, the app entity candidate of "alarm" (or the first natural language understanding candidate 505A) can be ranked higher than the app entity candidate of "timer" (or the second natural language understanding candidate 505B), and the app entity candidate of "timer" (or the second natural language understanding candidate 505B) can be ranked higher than the app entity candidate of "light" (or the second natural language understanding candidate 505C).

Optionally, in some implementations, based on the application entity usage information for the app entity candidates of "alarm", "timer", and "light", a first ranking score can be calculated for the app entity candidate of "alarm", a second ranking score can be calculated for the app entity candidate of "timer", and a third ranking score can be calculated for the app entity candidate of "light". The app entity candidates of "alarm", "timer", and "light" can be ranked based on the first, second, and third ranking scores. In some implementations, the first, second, and third ranking scores can be adjusted (e.g., multiplied by a weighted factor) based on whether the last time a corresponding app entity candidate ("alarm", "timer", "light") is within the temporal threshold (e.g., 5 min).

Alternatively or additionally, continuing with the above practical example, application capability binding information can be retrieved for the one or more app entity candidates (e.g., "alarm", "timer", and "light") from the app entity database 506. The application capability binding information (e.g., the dynamic application capability binding information) for the one or more app entity candidates (e.g., "alarm", "timer", and "light"), for instance, can indicate that a current status of the app entity candidate "alarm" is "inactive" but incapable of being "turned back on" due to the clock application which provides access to "alarm" is being updated, a current status of the app entity candidate "timer" can be "inactive" but the incapable of being "turned back on" due to the clock application which provides access to "alarm" is being updated, and a current status of the app entity candidate "light" is "inactive" and is capable of being turned back on (e.g., no malfunction detected).

In some implementations, a model input can be generated based on the app entity candidates of "alarm", "timer", and "light" (or the one or more natural language understanding candidates 505A, 505B, 505C) and the application capability binding information for the app entity candidates of "alarm", "timer", and "light". The model input can be processed using a classifier 508 (or a large language model) as input, to generate an output indicating a plurality of probabilities that correspond to the plurality of app entity candidates of "alarm", "timer", and "light", respectively. The plurality of probabilities can each indicate a likelihood that a corresponding app entity candidate (e.g., alarm, timer, light) is to be turned back on.

Alternatively, in some implementations, the model input can be generated based on the app entity candidates of "alarm", "timer", and "light" (or the one or more natural language understanding candidates 505A, 505B, 505C) and the application entity usage information for the app entity candidates of "alarm", "timer", and "light". The model input can be processed using the classifier (or the large language model) as input, to generate an output indicating a plurality of probabilities that correspond to the plurality of app entity candidates of "alarm", "timer", and "light", respectively. The plurality of probabilities can each indicate a likelihood that a corresponding app entity candidate (e.g., alarm, timer, light) is to be turned back on.

Alternatively, in some implementations, the model input can be generated based on the app entity candidates of "alarm", "timer", and "light" (or the one or more natural language understanding candidates 505A, 505B, 505C), the application capability binding information for the app entity candidates of "alarm", "timer", and "light", and the application entity usage information for the app entity candidates of "alarm", "timer", and "light". The model input can be processed using the classifier (or the large language model) as input, to generate an output indicating a plurality of probabilities that correspond to the plurality of app entity candidates of "alarm", "timer", and "light", respectively. The plurality of probabilities can each indicate a likelihood that a corresponding app entity candidate (e.g., alarm, timer, light) is to be turned back on.

In some implementations, a control signal can be generated based on the output of the classifier 508 (or the LLM), where an app entity candidate (e.g., light) that corresponds to a highest probability or highest ranking score (or highest adjusted ranking score) can be controlled to realize the determined natural language intent of "turn . . . back on" based on the control signal. Additionally, in some implementations, based on the output of the classifier or the LLM, a response 509 (e.g., light is back on) to the spoken utterance 500 can be generated and rendered via the client device 510.

Figure 6:
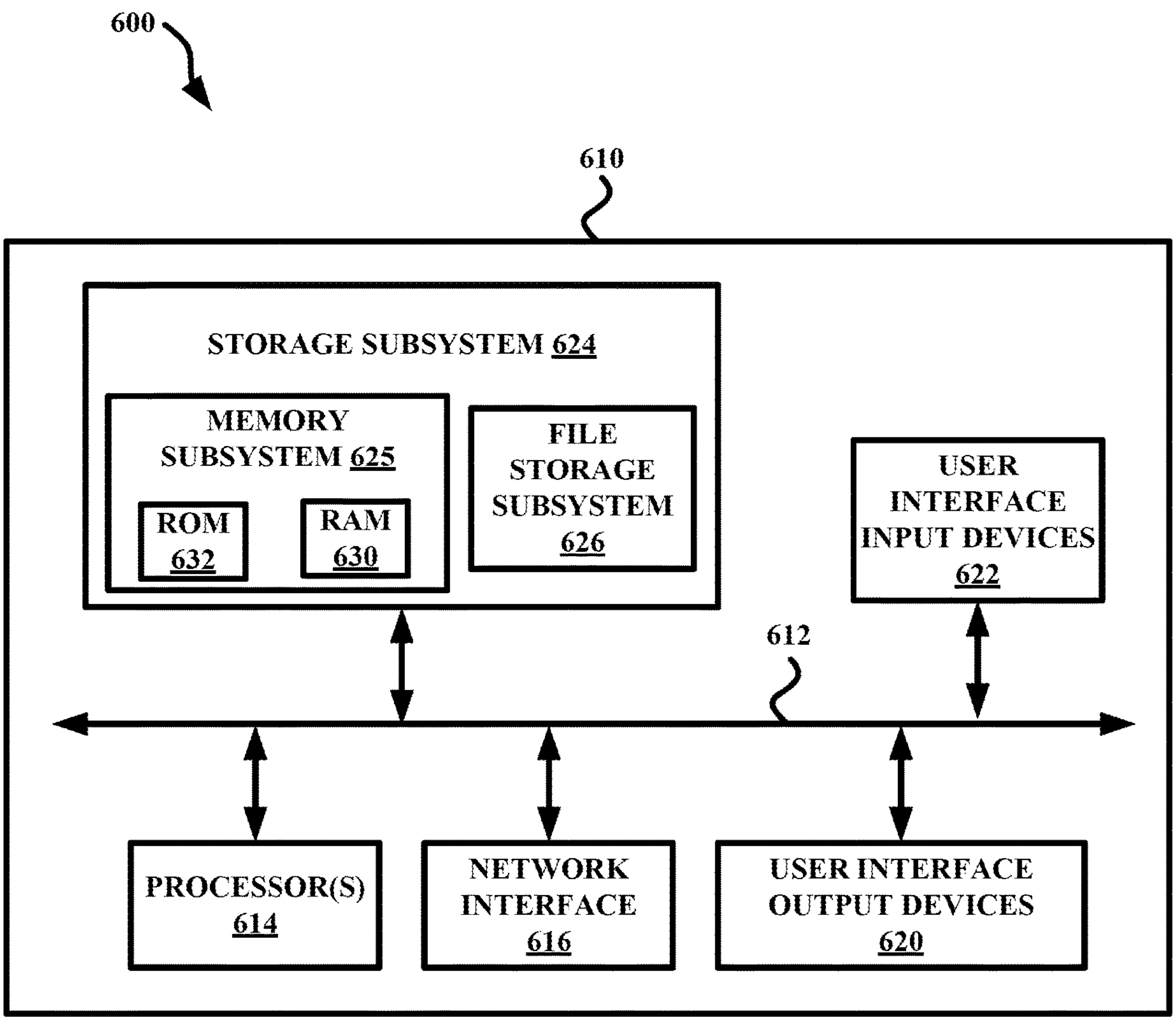
FIG. 6 illustrates an example architecture of a computing device, in accordance with various implementations.

FIG. 6 illustrates an example architecture of a computing device 610 that may optionally be utilized to perform one or more aspects of techniques described herein. In some implementations, one or more of a client computing device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving audio data capturing a user query that includes an action term but is void of any application entity that is descriptive of an application to which the action term is directed, the audio data being detected via one or more microphones of a client device. The user query that includes the action item but is void of any application entity can sometimes be referred to as a "verb-based succinct query". As a non-limiting example, the user query here can be, "turn it back on" (or "turn back on", etc.), which includes an action term of "turn . . . back on" but is void of a specific application entity (even though a pronoun of "it" is included). In this example, the audio data capturing "turn it back on" can be detected by one or more microphones of a client device, such as a cell phone or a stand-alone speaker.

In some implementations, the method may further include: processing the audio data to generate a transcription (sometimes referred to as "transcript") of the user query. Processing the audio data can be performed, for instance, using a speech recognition engine (e.g., the local ASR engine 111 in FIG. 1) local to the client device. Continuing with the non-limiting example above, for audio data capturing the verb-based succinct query of "turn it off", a transcription of "turn it back on" in natural language can be generated at the client device (e.g., the computing device 1 in FIG. 1).

In some implementations, the method may further include: processing, using a natural language understanding (NLU) engine, the transcription of the user query to determine an the action that corresponds to the action term, as well as to determine a plurality of entity instance candidates for the action, where each of the entity instance candidates is for a corresponding one of a plurality of applications (e.g., accessible via the client device). In some versions of these implementations, processing the transcription of the user query can be performed using a NLU engine (e.g., the cloud-based NLU engine 313 in FIG. 3) at a remote server (e.g., the server device 3 in FIG. 1) that receives the transcription from the client device. Processing the transcription using the cloud-based NLU engine (instead of local NLU engine) enables utilization of typically richer and stronger computing resources and capability of server(s)/cloud(s) (compared to local device(s)) to process and resolve the user query to N entity instance candidates. The client device can receive the determined action and entity instance candidates from the server(s)/cloud(s), and access the application entity database for locally stored usage data/information for app entities corresponding to the entity instance candidates, to resolve/select a particular application entity for performing the determined action. This enables the client device to leverage computing resources from the server(s)/cloud(s), while preventing the client device having to continuously send "usage data" over to the cloud (which would consume excessive network resources). Further, this ensures security of the "usage data" by keeping it local on the client device and not transmitting it over to the cloud(s).

Continuing with the non-limiting example above, the NLU engine can process the transcription of "turn it back on" to determine an action of "turning back on" that corresponds to the action term (e.g., "turn back on"), and determine the plurality of entity instance candidates (e.g., a first entity instance candidate of "turn <music instance> back on", and a second entity instance candidate of "turn <camera instance> back on", etc.) for the action of "turning back on". In this example, the first entity instance candidate of "turn <music instance> back on" corresponds to a "music" application, and the second entity instance candidate of "turn <camera instance> back on" corresponds to a "camera" application. The determined action (e.g., "turning back on") and the determined plurality of entity instance candidates (e.g., <camera instance> and <music instance>) can then be transmitted by the server device to the client device.

In some implementations, the method may further include: querying an application entity database storing a set of application entities, for usage information and/or capability information of application entities that correspond to the plurality of entity instance candidates. The application entity database can be stored locally at the client device, and querying the application entity database can be performed at the client device by one or more processors of the client device. The application entity database can store usage information and/or capability information for each of the set of application entities, so that the usage information and/or capability information for the application entities that correspond to the plurality of entity instance candidates can be retrieved from the application entity database. The usage information, for instance, includes a last access time, a last modification time, a usage frequency, and/or a full usage history for each of the set of application entities.

The capability information, for instance, includes static capability information listing action(s) each of the set of application entities is capable of performing, so as to be indicative of whether any of the set of application entities is associated with a function that corresponds to the action. The capability information, for instance, includes dynamic capability information listing a specific status for each of the set of application entities required to perform a corresponding one of the listed action(s), so as to be indicative of whether a current status for each of the set of application entities enables a respective application entity of the set of application entities to perform the action.

Continuing with the non-limiting example above, based on the determined plurality of entity instance candidates (e.g., <camera instance>, <music instance>), usage information (last access time, lastly performed action, etc.) and/or capability information (a current status-"ON" or "OFF", etc.), for app entities (song A, song B, etc.) available for access via the music application and for app entities (e.g., "pet camera" that controls a pet cam device, "entrance camera" that corresponds to a camera installed at an entrance of a building, etc.) available for access via the camera application, can be retrieved by querying the application entity database. For instance, the application entity database can provide the usage information and capability information indicating that, within the music application, the "song A" entity is currently "OFF" and was last turned off 5 minutes ago, and the "song B" entity is currently "OFF" and was last turned off 5 days ago. The usage/capability information can further indicate that within the camera application, the entity "pet camera" is "ON" and the entity "entrance camera" is "OFF" and was last turned off 5 hours ago. Based on the capability information (e.g., ON, OFF, etc.), it can be determined that among the application entities ("song A", "song B", "pet camera", and "entrance camera"), only "song A", "song B", and "entrance camera" can be "turned back on" for having an "OFF" status.

Continuing with the non-limiting example above, the app entities "song A", "song B", and "entrance camera" need to be ranked. In some implementations, to rank the capable app entities that are capable of performing the determined action, a temporal order for the application entities (or the capable application entities) is determined from the usage information of the one or more application entities (e.g., indicating a last usage or modification time for each of the one or more application entities). For instance, based on the usage information indicating that playing of the app entity "song A" was lastly turned off 5 minutes ago, playing of the app entity "song B" was lastly turned off 5 days ago, and playing of "entrance camera" was lastly turned off 5 hours ago, these application entities can be ranked as: song A>entrance camera>song B.

Optionally, in some implementations, prior to (or subsequent to) ranking the capable app entities (e.g., "song A", "entrance camera", "song B"), one or more capable app entities can be filtered out based on a temporal threshold for a last usage (access, modification or action) time for each of these app entities. The temporal threshold can be, for instance, 10 minutes. In this case, the app entities "entrance camera" and "song B" can all be filtered out, leaving only the app entity "song A" to be "turned back on". If the temporal threshold is, for instance, 6 hours. In this case, the app entity "song B" can be filtered out, leaving the app entities "song A" and "entrance camera" to be ranked (e.g., based on the aforementioned temporal order) for an action of "turning back on", e.g., app entity of "song A" has a priority of being turned back on over the app entity of "entrance camera". Alternatively or additionally, the app entities can be ranked based on additional factors in addition to the temporal order, such as a type of the app entities to be ranked, and a type of device(s) controlled by the app entities that are to be ranked, etc.

In some implementations, the method may further include: generating a model input based on the user query void of any app entities and the usage information of the one or more application entities. In some versions of those implementations, the model input can be generated further based on the capability information of the app entities.

In some implementations, alternatively or additionally, the model input includes the temporal order for the application entities. In some implementations, alternatively or additionally, the model input includes the temporal threshold (e.g., 10 min, 6 hours, etc.) for a last usage or modification time for each of the application entities.

In some implementations, the method may further include: processing, using a trained machine learning model, the model input to generate a model output. In some implementations, the method may further include: causing, based on the model output, one or more actions to be performed. In some versions of these implementations, the trained machine learning model is a classifier model, and the model output indicates a particular application entity to be selected from the application entities. The particular application entity can be a top ranked application entity among the application entities (e.g., "song A" in the above non-limiting example). In these implementations, causing the one or more actions to be performed comprises: causing the particular entity indicated in the model output to perform the action that corresponds to the action term in the user query. For example, playing of the song A can be turned back on, responsive to the user query of "turn it back on".

In some alternative versions of implementations, the trained machine learning model is a generative model, and the model output indicates a response responsive to the user query. For instance, the generative model can be a trained large language model (LLM) that outputs a plurality of tokens from which the response responsive to the user query can be formulated. In this case, causing the one or more actions to be performed includes: causing the response to be rendered visually or audibly to a user of the client device. For instance, the response can be "Do you want me to turn back on song A?", as the response responsive to the user query of "turn back on".

In various implementations, an additional method implemented by one or more processors is provided, where the method includes: receiving audio data capturing a user query that includes an action term but is void of any application entity that is descriptive of an application to which the action term is directed, the audio data being detected via one or more microphones of a client device; processing the audio data to generate a transcription of the user query; processing, using a natural language understanding engine, the transcription of the user query to determine an the action that corresponds to the action term and a plurality of one or more entity instance candidates for the action, each of the entity instance candidates being for a corresponding one of a plurality of applications accessible via the client device; querying an application entity database storing a set of application entities, for usage information of application entities that correspond to the plurality of entity instance candidates; generating, based on the user query and the usage information of the application entities that correspond to the plurality of entity instance candidates, one or more actions to be performed; and causing the one or more actions to be performed.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:

receiving audio data capturing a user query that includes an action term but is void of any application entity that is descriptive of an application to which the action term is directed, the audio data being detected via one or more microphones of a client device;

processing the audio data to generate a transcription of the user query;

processing, using a natural language understanding engine, the transcription of the user query to determine an action that corresponds to the action term and a plurality of entity instance candidates for the action, each of the entity instance candidates being for a corresponding one of a plurality of applications accessible via the client device;

querying an application entity database storing a set of application entities, for usage information of application entities that correspond to the plurality of entity instance candidates, wherein the application entities are stored in the application entity database based on being donated by multiple of the plurality of applications accessible via the client device;

generating a model input based on the user query and the usage information of the application entities;

processing, using a trained machine learning model, the model input to generate a model output; and causing, based on the model output, one or more actions to be performed by at least one of the plurality of applications accessible via the client device.

2. The method of claim 1, wherein the application entity database is accessible locally at the client device, and wherein querying the application entity database is performed at the client device.

3. The method of claim 1, wherein the usage information includes a last access time, a last modification time, a usage frequency, and/or a full usage history for each of the set of application entities.

4. The method of claim 1, wherein the plurality of entity instance candidates include a clock instance, and wherein application entities corresponding to the clock instance are clock entities including a timer, an alarm, and a stopwatch.

5. The method of claim 1, wherein the trained machine learning model is a classifier model, and wherein the model output indicates a particular application entity to be selected from the application entities.

6. The method of claim 5, wherein the particular application entity is a top ranked application entity among the application entities.

7. The method of claim 5, wherein causing the one or more actions to be performed comprises:

causing the particular application entity indicated in the model output to perform the action that corresponds to the action term in the user query.

8. The method of claim 1, wherein the trained machine learning model is a generative model, and the model output indicates a response responsive to the user query.

9. The method of claim 8, wherein causing the one or more actions to be performed includes:

causing the response to be rendered visually or audibly to a user of the client device.

10. The method of claim 1, wherein a temporal order for the application entities is determined from the usage information of the application entities indicating a last usage or modification time for each of the application entities.

11. The method of claim 10, wherein the model input includes the temporal order for the application entities.

12. The method of claim 1, wherein the model input includes a temporal threshold for a last usage or modification time for each of the application entities.

13. The method of claim 1, wherein the transcription is processed using the natural language understanding engine at a remote server that is in communication with the client device.

14. The method of claim 13, wherein the determined action and the determined plurality of entity instance candidates for the action are received by the client device from the remote server.

15. The method of claim 1, wherein generating the model input is performed by one or more processors of the client device.

16. The method of claim 1, wherein the trained machine learning model is accessible at the client device, and wherein processing the model input to generate the model output is performed by one or more processors of the client device.

17. The method of claim 1, wherein the application entity database further stores static capability information indicative of whether any of the set of application entities is associated with a function that corresponds to the action.

18. The method of claim 1, wherein the application entity database further stores dynamic capability information indicative of whether a current status for each of the set of application entities enables a respective application entity of the set of application entities to perform the action.

19. A method implemented by one or more processors, the method comprising:

receiving audio data capturing a user query that includes an action term but is void of any application entity that is descriptive of an application to which the action term is directed, the audio data being detected via one or more microphones of a client device;

processing the audio data to generate a transcription of the user query;

processing, using a natural language understanding engine, the transcription of the user query to determine an action that corresponds to the action term and a plurality of entity instance candidates for the action, each of the entity instance candidates being for a corresponding one of a plurality of applications accessible via the client device;

querying an application entity database storing a set of application entities, for usage information of application entities that correspond to the plurality of entity instance candidates, wherein the application entities are stored in the application entity database based on being donated by multiple of the plurality of applications accessible via the client device;

generating, based on the user query and the usage information of the application entities that correspond to the plurality of entity instance candidates, one or more actions to be performed; and causing the one or more actions to be performed by at least one of the plurality of applications accessible via the client device.

* * * * *